United States Patent
Elley et al.

(10) Patent No.: US 7,058,798 B1
(45) Date of Patent: Jun. 6, 2006

(54) METHOD ANS SYSTEM FOR PRO-ACTIVE CREDENTIAL REFRESHING

(75) Inventors: Yassir K. Elley, Waltham, MA (US); Anne H. Anderson, Acton, MA (US); Stephen R. Hanna, Bedford, MA (US); Sean J. Mullan, Dublin (IE); Radia Joy Perlman, Acton, MA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 09/547,183

(22) Filed: Apr. 11, 2000

(51) Int. Cl.
*G06F 7/04* (2006.01)

(52) U.S. Cl. .............. 713/26; 726/30; 726/7

(58) Field of Classification Search ........ 713/201, 713/200, 156; 726/6, 5, 26, 30, 27
See application file for complete search history.

(56) References Cited

U.S. PATENT DOCUMENTS

| | | |
|---|---|---|
| 5,173,939 A | 12/1992 | Abadi et al. |
| 5,220,604 A | 6/1993 | Gasser |
| 5,224,163 A | 6/1993 | Gasser et al. |
| 5,261,002 A | 11/1993 | Perlman et al. |
| 5,283,830 A | 2/1994 | Hinsley et al. |
| 5,315,657 A | 5/1994 | Abadi et al. |
| 5,586,260 A | 12/1996 | Hu |
| 5,764,772 A | 6/1998 | Kaufman et al. |
| 5,768,519 A * | 6/1998 | Swift et al. ............ 709/223 |
| 5,901,227 A | 5/1999 | Perlman |
| 5,991,807 A | 11/1999 | Schmidt et al. |
| 6,079,020 A | 6/2000 | Liu |
| 6,088,805 A | 7/2000 | Davis et al. |
| 6,138,235 A | 10/2000 | Lipkin et al. |
| 6,158,011 A | 12/2000 | Chen et al. |
| 6,212,634 B1 | 4/2001 | Geer et al. |
| 6,216,231 B1 * | 4/2001 | Stubblebine ............ 713/201 |
| 6,223,291 B1 | 4/2001 | Puhl et al. |

(Continued)

FOREIGN PATENT DOCUMENTS

| | | |
|---|---|---|
| EP | 0779570 | 6/1997 |

(Continued)

OTHER PUBLICATIONS

Gaul et al., "Mining Generalized Association Rules for Sequential and Path Data," 2001,*IEEE*, pp. 593-596.

(Continued)

*Primary Examiner*—Norman M. Wright
(74) *Attorney, Agent, or Firm*—Kudirka & Jobse, LLP

(57) ABSTRACT

The basic concept is that before a resource is accessed, the entity that has the burden of gathering the credentials, pro-actively refreshes the credentials and keeps them current. In one instance, a presenter of credentials, for example, a client, pro-actively refreshes the credentials such that at the time of presentation, the credentials meet the resource-specific constraints of a recipient of credentials, for example, a resource server. For each resource that it protects, a resource server typically establishes various constraints such as a recency requirement, which specifies how recently a credential has to have been issued to be accepted as an adequate credential. Other constraints may include maximum certificate chain length, trust level and so forth. In another instance, a recipient of credentials pro-actively gathers and refreshes credentials to prevent un-authorized access to the various resources it is protecting.

64 Claims, 4 Drawing Sheets

U.S. PATENT DOCUMENTS

| | | | |
|---|---|---|---|
| 6,230,266 B1 * | 5/2001 | Perlman et al. | 713/158 |
| 6,256,741 B1 * | 7/2001 | Stubblebine | 713/201 |
| 6,263,434 B1 | 7/2001 | Hanna et al. | 713/156 |
| 6,275,941 B1 | 8/2001 | Saito et al. | |
| 6,301,658 B1 | 10/2001 | Koehler | |
| 6,308,274 B1 | 10/2001 | Swift | |
| 6,366,913 B1 | 4/2002 | Fitler et al. | |
| 6,370,648 B1 | 4/2002 | Diep | |
| 6,397,329 B1 | 5/2002 | Aiello et al. | |
| 6,405,313 B1 | 6/2002 | Reiter et al. | |
| 6,438,690 B1 | 8/2002 | Patel et al. | |
| 6,496,858 B1 | 12/2002 | Frailong et al. | |
| 6,678,700 B1 * | 1/2004 | Moore et al. | 707/200 |
| 6,732,277 B1 * | 5/2004 | Vandergeest et al. | 726/19 |
| 6,883,100 B1 * | 4/2005 | Elley et al. | 726/5 |
| 2002/0144149 A1 | 10/2002 | Hannah et al. | |
| 2003/0028585 A1 | 2/2003 | Yeager et al. | |
| 2003/0041141 A1 | 2/2003 | Abdelaziz et al. | |
| 2003/0055894 A1 | 3/2003 | Yeager et al. | |
| 2003/0055898 A1 | 3/2003 | Yeager et al. | |
| 2003/0056093 A1 | 3/2003 | Huitema et al. | 713/156 |
| 2004/0054899 A1 | 3/2004 | Balfanz et al. | 713/168 |

FOREIGN PATENT DOCUMENTS

| | | |
|---|---|---|
| EP | 0942568 | 9/1999 |
| WO | WO 98/10381 | 3/1998 |
| WO | WO 99/41878 | 8/1999 |

OTHER PUBLICATIONS

Kaufman, Charlie et al., "Network Security, Private Communication in a Public World," PTR Prentic Hall, 1995, chapters 5, 7 and 8 pp. 129-161, and pp. 177-222.

Kaufman, Charlie et al., "Network Security, Private Communication in a Public World," PTR Prentice Hall, 1995, pp. 455-459.

Micali, "Enhanced Certificate Revocation System," MIT Laboratory for Computer Science.

Micali, "Efficient Certificate Revocation," MIT Laboratory for Computer Science (Mar. 22, 1996).

Myers et al., "X.509 Internet Public Key Infrastructure Online Cerfficate Status Protocol OCSP," (Sep., 1998).

Morrissey, P., "Demystifying Crisco Access Control Lists," Apr. 1998, *Network Computing,* pp. 116, 118 and 120.

Rivest, "Can We Eliminate Certificate Revocation Lists?" MIT Laboratory for Computer Science.

Ryutov et al., "Access Control Framework for Distributed Application," *USC/Information Sciences Institute* (Aug. 7, 1998).

Woo et al., "A Framework for Distributed Authorization" Nov. 1993, ACM 1st Conference Computer and Communication Security, p. 112-118.

International Search Report completed on Oct. 2, 2002 amd mailed Oct. 9, 2002.

* cited by examiner

METHOD ANS SYSTEM FOR PRO-ACTIVE CREDENTIAL REFRESHING

RELATED CASES

This application discloses subject matter also disclosed in the following pending applications, filed herewith and assigned to Sun Microsystems, Inc., the assignee of this invention:

U.S. patent application entitled "METHOD AND SYSTEM FOR PRESENTATION OF NON-REVOCATION CERTIFICATES", filed on May 10, 1999 and given a Ser. No. 09/307,953;

U.S. patent application entitled "METHOD AND SYSTEM FOR DYNAMIC ISSUANCE OF GROUP CERTIFICATES", filed on May 10, 1999, whose serial number has yet to be assigned; and U.S. patent application entitled "METHOD AND SYSTEM FOR PROVING MEMBERSHIP IN A NESTED GROUP USING CHAINS OF CREDENTIALS", filed on May 10, 1999, whose serial number has yet to be assigned.

FIELD OF THE INVENTION

This invention relates generally to authorization for access to a resource between entities in a network, and more particularly to the maintenance of credentials required for access to the resource.

BACKGROUND OF THE INVENTION

During ordinary operation of computer networks it is usual for a client to access a server and to request access to a resource provided by that server. A client may be thought of as a program running on a work station, desktop type computer, personal digital assistant (PDA) or even an embedded device, and a server may be thought of as a program performing a service for a plurality of clients. The client may also be thought of as the computer running the client software, and the server may also be thought of as the computer running the server software. For some purposes, the client may be thought of as a user on whose behalf a request is being made. In some cases, the same computer may run both the client software and the server software. The service is ordinarily provided by the execution of a server program at the request of the client. Specifically, the service provides a resource to the client. The resource may be any operation that is executed, affected or controlled by a computer, such as a word processing or spread-sheet program, the transfer of files, or some other data processing function. The resource access may also include the ability to read or to modify entries in a database, execute or modify a program maintained by the server, or even modify data maintained by another computer in the system.

In deciding whether or not to grant access to a resource, a resource server must answer two questions:

A. "Is the client correctly identifying himself?" and

B. "Is the identified client authorized to access the requested resource?"

The first question involves a process called "client authentication." The second involves reference to an authorization decision mechanism, such as an Access Control List (ACL) maintained by the server and containing a list of individual clients and/or client groups who are permitted access to the resource.

Client authentication can be accomplished using public key cryptographic methods, as described in *Network Security, Private Communication in a Public World*, Charlie Kaufman, Radia J. Perlman, and Mike Speciner, PTR Prentice Hall, Englewood Cliffs, N.J., 1995, (Kaufman et al.) at chapters 5, and 7 and 8, pages 129–161 and 177–222. Specifically, client Alice can authenticate herself to resource server Bob if she knows her private key and Bob knows Alice's public key. Bob has obtained Alice's public key in an identity certificate from a trusted certification authority or from a certification authority in a chain extending from a trusted authority. Other methods of authentication may be used and the present invention does not depend on which method is used.

An identity certificate may be revoked. One common method of dealing with revocation involves the use of Certificate Revocation Lists (CRLs) which are analogous to the books of revoked credit card numbers that were at one time published and distributed periodically to merchants. Like these books, CRLs suffer from being expensive to distribute and are therefore infrequently distributed. There may also be a significant period of time between certificate revocation and CRL distribution, during which the resource server is unaware of the revocation.

For maximum security, the certificate authority may be off-line and therefore inaccessible on a transaction-by-transaction basis. Moreover, issuance of an identity certificate may be a relatively lengthy process so that, even if the certificate authority is online, it is impractical to issue an up-to-date certificate for each transaction. An alternative approach to certificate revocation involves the use of on-line revocation servers, which maintain lists of revoked identity certificates. With on-line revocation servers, up-to-date revocation status can be determined.

At the same time, if a revocation server's private key has been compromised, the damage will be more limited than if an on-line certification authority's private key were compromised. Specifically, if the certification authority's private key were compromised, the authority might issue new certificates to unauthorized clients. On the other hand, a compromised revocation server would result only in continued access by a client with revoked authorization. Specifically, a compromised revocation server can never grant unauthorized access to a client who has never had authorized access. Although a compromised revocation server may wrongly revoke an authorized client, the revocation would only be a denial-of-service attack.

The use of on-line revocation servers, which is analogous to the method employed today for the authorization of credit card purchases, is also expensive because the resource server usually contacts an on-line revocation server at each transaction to determine whether the certificate has been revoked. The OCSP (On-line Certificate Status Protocol) proposed standard of the PKIX working group (RFC 2560) at <ftp://ftp.isi.edu/in-notes/rfc2560.txt>, specifies that the revocation status for each certificate can be retrieved from the revocation server and cached by the resource server verifying that certificate. Although caching improves resource server efficiency, it still places a burden on the resource server, which may already be burdened with the processing of resource access requests.

An authentication and authorization arrangement introduced by the Open Software Foundation (OSF) and known as the Distributed Computing Environment (DCE) model has a central database on a machine known as a "privilege server" or "central trusted authority." When a client logs on to the system, the privilege server issues a secret, or symmetric, key certificate (as opposed to a public, or asymmetric, key certificate) identifying all the groups of which the client is a member. The client presents this certificate to any server on which the client wishes to access a resource. The resource server has an ACL for the resource, and the ACL includes both authorized clients and client groups. If neither the client nor any one of the groups of which the client is a member is listed in the ACL, client access is denied. This approach saves some work for the server, but requires that a central trusted authority know all the groups of which the client is a member and also that the client's group list is small enough so that presentation of the entire collection is not unwieldy. The DCE model is described in Kaufman et al. at Section 17.7, pages 455–459.

When a client wishes to access a resource on a server, at least one of them needs to gather and maintain various credentials for client identification and authorization. These credentials may include public key identity credentials, group membership credentials, group non-membership credentials and non-revocation credentials. In some cases, the client gathers the various credentials and submits them to the server for access to the resource. However, for the client, such task may be time consuming and particularly burdensome in situations where the gathering occurs at the time of access. The client may therefore cache the credentials for future use. However, the server may have various constraints on the credentials it will accept, such as recency requirements. If the server refuses to accept "stale" credentials, the client may have to re-gather the credentials, thereby delaying the access. In other cases, the server does the work of gathering the various credentials to determine whether a client is authorized to access the resources. If the server gathers the various credentials at the time of client access, this may cause an undesirable delay to the client. The server may also cache the various credentials. However, if the cached credentials do not meet the server's recency requirements, it will have to re-gather the credentials, thereby delaying the access. This problem is not limited to the client-server situation; it exists whenever an entity needs to gather credentials and keep them up to date.

SUMMARY OF THE INVENTION

In accordance with the invention, the entity that has the burden of gathering the credentials, pro-actively refreshes the credentials and keeps them current. For instance, a presenter of the credentials, for example, a client, pro-actively refreshes the credentials such that at the time of presentation, the credentials meet the resource-specific constraints of a recipient of credentials, for example, a resource server. Generally, these certificates include time stamps designating the date and time of issue. For each resource that it protects, a resource server typically establishes various constraints such as a recency requirement which specifies how recently a credential has to have been issued to be accepted an adequate credential. Other constraints may include maximum certificate chain length, trust level and so forth. In another instance, a recipient of credentials pro-actively gathers and refreshes credentials to prevent unauthorized access to the various resources it is protecting.

According to an embodiment of the invention, the entity that has the burden of maintaining the credentials, stores in a memory, a profile collection that contains one or more credential profiles. A credential profile includes information such as a credential identifier, when the credential was issued, when the credential was last used, on which resource, resource constraints such as a recency requirement and so forth. At a refresh trigger event, a refresh procedure is performed in accordance with a refresh policy. For example, the refresh policy may be simple such as (1) refresh all credentials older than 10 minutes, or it may have more than one criterion such as (2) refresh all credentials used in the last 24 hours and older than 10 minutes, or (3) refresh all credentials used in the last 24 hours and only if older than the resource recency requirement. These various criteria may be deduced from the information stored in the credential profiles. Note that the refresh policies are merely examples. The refresh policies will be tailored according to a desired result.

Using a refresh policy, the entity maintaining the profile collection examines each credential profile in the profile collection to determine if it needs to be refreshed. If the credential needs to be refreshed, then the entity pro-actively refreshes the credential. Once the credential has been updated in the credential profile, the entity proceeds to the next credential profile and repeats the process until all the credentials in the profile collection have been examined.

The pro-active refreshing of credentials is not limited to the client-server situation, but applies to any entity that presents credentials (including chains of group credentials) to another entity. For example, an entity may send a signed e-mail to a recipient and may also present credentials that the recipient may find useful in validating the signature on the e-mail. For a given transmission, the entity presenting credentials is defined as a "presenter of credentials", and the entity receiving the credentials is termed as a "recipient of credentials". A particular entity may be a presenter of credentials in one transmission and a recipient of credentials in a second transmission. For example, Alice and Bob may want to mutually authenticate each other for communications between them, in which case, each would have to present credentials to the other. When Alice transmits credentials to Bob, Alice is a presenter of credentials and Bob is a recipient of credentials. Alternatively, when Bob transmits credentials to Alice, Bob is a presenter of credentials and Alice is a recipient of credentials. Other aspects and advantages of the invention will be further described in the detailed description to follow below.

BRIEF DESCRIPTION OF THE DRAWINGS

The above and further advantages of the invention may be better understood by referring to the following description in conjunction with the accompanying drawings in which like reference numbers indicate identical or functionally similar elements.

DETAILED DESCRIPTION OF AN ILLUSTRATIVE EMBODIMENT

Introduction

Figure 1:
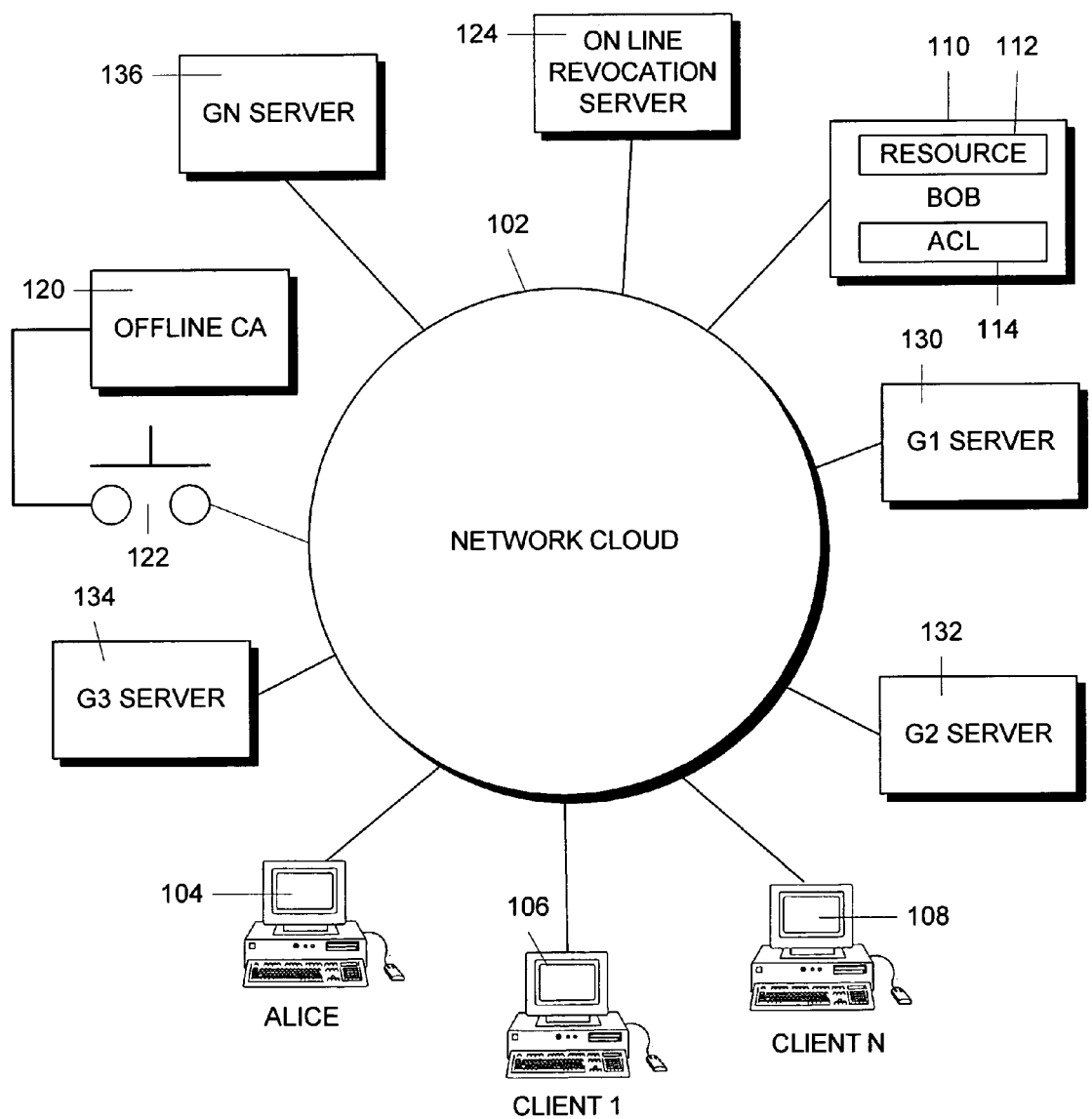
FIG. 1 is a block diagram of a computer network.

The basic concept is that when a resource is to be accessed, the entity that has the burden of gathering the credentials, has an up-to-date set of credentials. This is accomplished by pro-actively refreshing the credentials so as to keep them current. In one instance, a presenter of credentials, for example, a client, pro-actively refreshes its credentials such that at the time of presentation, the credentials meet the resource-specific constraints of a recipient of credentials, for example, a resource server. Generally, these certificates include time stamps designating the date and time of issue. For each resource that it protects, a resource server typically establishes various constraints such as a recency requirement, which specifies how recently a credential has to have been issued to be accepted as an adequate credential. Other constraints may include maximum certificate chain length, trust level and so forth. In another instance, a recipient of credentials pro-actively gathers and refreshes credentials to prevent un-authorized access to the various resources it is protecting.

Each group has a name and the location of its group server can be obtained from a system directory. The group also has a public key and an associated private key, which is used for signing group certificates. Further, a group can have as members individuals and other groups. That is, a "parent", or nested, group may have "child" groups for members. It may even have a complicated Boolean expression for membership, such as G1→(G2 AND G3) AND NOT (G4), meaning that all members of groups G2 and G3 are in the group G1, except for members of group G4.

A group membership or group non-membership certificate usually indicates membership status for a specified name, e.g., client "Alice" is a member of group G1, although the certificate may also indicate membership status for a specified public key or other identity. In most cases, a group membership list associated with a group will be maintained by an on-line group server. However, the on-line group server may need to dynamically decide whether a given client is a member of the group, i.e. the server may do more than simply refer to a membership list. In the case where there is no group membership list, group membership will be determined by some other criterion. For example, group membership could be determined by a particular attribute of a client. In another case, where the client may be a member of a child group, the on-line group server may obtain proof of the client's membership in the child group. Alternatively, the client may present the proof of membership in the child group to the on-line group server.

A fresh group membership certificate can be obtained from an on-line group server at any time and presentation of the certificate to the resource server will be sufficient to prove membership in the group. However, an off-line group server infrequently issues certificates, such as when a client joins the group or when the entire membership list is updated. The client will then request a newly-issued non-revocation certificate from an associated on-line revocation server and present it, along with the group membership certificate, to the resource server.

Group Memberships and Nested Groups

As discussed above, a group may have as its members other groups, or subgroups and the client may contact child group servers to obtain proof of membership in a child group. For example, the aforementioned client Alice may attempt to access a resource on resource server "Bob". If Alice is not listed as an individual on the resource ACL, but groups G1, G2 and G3 are listed on the ACL, Bob returns to Alice the message:

"Access denied, unless you can prove membership in group G1, G2 or G3."

In contrast to traditional systems, this message does not have to be sent during session establishment (i.e., the initial handshake between the client and the server). It may be the case that Alice had previously established the session with Bob and at this later time has decided to access the resource protected by Bob. At this point Bob may challenge Alice to present additional credentials. Alice may have recently obtained a membership certificate for one of these "root" groups in the course of obtaining access to some other server or for some other reason. If not, the client system can prompt the human operator to provide guidance as to the groups of which the client is likely to be a member. This may save substantial time if there are a large number of groups on the ACL.

If human intervention is not desirable, an exhaustive search may be undertaken: Alice communicates with on-line group servers containing the group membership lists of groups G1, G2 and G3 and attempts to obtain a membership certificate from one of these servers.

In another variation, rather than performing an exhaustive search, Alice may be able to narrow the search by relying on previously stored information to determine groups in which Alice is likely to be a member. For example, if Alice has an old group membership certificate for group G1, Alice can attempt to obtain a new group membership certificate from the G1 group server before undertaking an exhaustive search for a group certificate.

Although Alice may not be listed as a member of group G1, group G1 may be a nested group, i.e., it may be a parent to the child groups, or subgroups, G5 and G6. The G1 group server will ask Alice:

"Can you prove membership in group G5 or G6?"

Alice then communicates with the G5 and G6 servers. For example, if group G5 lists Alice as a member, the G5 server returns a group membership certificate in group G5. Alice returns to the G1 server to request a group membership certificate, armed with the certificate from the G5 server. The G1 server then grants Alice a group membership certificate. Now, armed with the certificate from root group G1, Alice can go to Bob and obtain access to the requested resource. A group membership certificate is not the only mechanism by which Alice may prove membership in group G5 to the G1 server. For example, Alice may alternatively present the group G5 membership list, signed by group G5, or some other proof of group membership.

The example presented above is rather simple. In some cases, Alice will be unable to establish membership in either a root or a child group and will be denied access to the resource. In other cases, Alice may have to search down several subgroup levels before finding membership in a group. To facilitate this task, Alice maintains a family tree for each root group, tracing the path of subgroups "visited" during a search. Alice can then easily detect and abort loops (where G5 is a member of G1 is a member of G5 is a member of G1 and so on). When membership in a subgroup is found, Alice moves back up the path collecting a group membership certificate from each successive group server and presenting it to the next higher group server until the root group is reached. Alice then presents to Bob the group membership certificate issued by the root group server.

In the above scenario, it has been assumed that the group servers issuing group membership certificates are on-line and thus create newly-issued group certificates at runtime. In that case, the group membership certificates created at runtime are fresh enough so as not to need any further proof of non-revocation. If a group certificate is "old", i.e., it was obtained by the client more than some specified time prior to a request for access to a resource, as ascertained from a time stamp included in the certificate, the resource server will require a newly-issued certificate from the on-line group server.

If the root group server is off-line, the client may obtain from an on-line source, such as a directory, a certificate stating that the client, or a subgroup, is a member of the root group. The client will then request a corresponding non-revocation certificate from an on-line revocation server. In the above example, if the G1 server is off-line, Alice will assure Bob that the certificate designating group G5 as a member of group G1 has not been revoked, i.e. Alice will retrieve a newly-issued non-revocation certificate from the group G1 on-line revocation server. When the client is a member of a subgroup and the root group server is off-line, the client will present a chain of two or more group membership certificates to the resource server. Additionally, the client will present a valid non-revocation certificate from the appropriate on-line revocation server for the group membership certificate issued by the off-line root group server. If the next lower group server is also off-line, the client will also present a valid non-revocation certificate from the appropriate on-line revocation server for the group membership certificate issued by the offline subgroup group server. The chain continues until it includes either a group membership certificate issued by the highest level on-line group server in the family tree, or the group membership and non-revocation certificates for all subgroups down to the lowest level group in the family tree. In the present example, Alice will present to Bob the certificate designating group G5 as a member of group G1 and its corresponding non-revocation certificate, and will also present a group membership certificate issued by the on-line G5 server designating Alice as a member of group G5. Similarly, if a group server is on-line, but its subgroup servers are off-line, Alice may need to present a chain of group membership certificates to the on-line group server in order to prove membership in a subgroup.

In a different example, the G1 group server may grant membership to anyone who can prove membership in group G11 and non-membership in group G12. Accordingly, Alice will retrieve a group membership certificate from the G11 group server and a group non-membership certificate from the G12 group server and present those certificates to the G1 group server. The G1 group server will then issue a G1 group membership certificate, which Alice will present to Bob. If the G1 group server is off-line, Alice will need to present to Bob two chains of credentials, including proofs of group membership and non-membership. Specifically, Alice will need to present to Bob a first chain including a group G1 membership list (signed by G1), along with the group membership certificate from group G11, and a second chain including the signed group G1 membership list, along with the group non-membership certificate from group G12. In this case, because Alice does not need to twice present the signed group G1 membership list, Alice simply presents the signed group G1 membership list, along with the group G11 membership certificate and the group G12 non-membership certificate. Thus, in order to prove membership in a nested group, Alice will sometimes need to present both proofs of group membership and proofs of group non-membership.

Group Non-Membership Certificates

A resource server may also prohibit access to a resource based on client membership in one or more groups. In this case, the client will gather and present group non-membership certificates stating that the client is not a member of the designated groups. For example, group G1 members may be permitted access to a resource, unless they are also group G2 members. Alice will have to prove both membership in group G1 and NON-membership in group G2. To prove non-membership in group G2, Alice will present a group G2 non-membership certificate to Bob. Alice requests a non-membership certificate from the G2 group server and presents the certificate, along with a group G1 membership certificate to Bob.

The work required to gather the credentials necessary to prove group non-membership is more intensive than that required for group membership. For each prohibited root group, the client will be required to prove non-membership in each and every group extending from the root. For example, Bob may deny resource access to all members of group G2. Therefore, Alice will request a group non-membership certificate from the G2 server. The root group G2 might have as members the child groups, or subgroups, G7 and G8. The G2 group server will ask Alice:

"Can you prove non-membership in groups G7 and G8?"

Alice then requests a group non-membership certificate from both the G7 and G8 servers. If group G7 also lists the groups G9 and G10, Alice requests a group non-membership certificate from both the G9 and G10 servers. Alice presents the G9 and G10 group non-membership certificates to the G7 server which then issues a group non-membership certificate. Alice next presents the G7 and G8 group non-membership certificates to the G2 server and receives a G2 group non-membership certificate. Now, armed with a group non-membership certificate from group G2, Alice can go to Bob and prove non-membership in root group G2.

The case of off-line group servers becomes more difficult when trying to prove non-membership in a nested group. For example, if in the above example the G2, G7, and G8 group servers are off-line, Alice will need to present a chain of credentials to Bob, including proofs of both group membership and group non-membership. Specifically, Alice may present to Bob a group G2 membership list (signed by G2), a group G7 membership list (signed by G7) and a group G8 membership list (signed by G8). From these credentials, Bob will be aware of the memberships of groups G2, G7 and G8, and Bob will be able to indirectly verify that Alice is not a member of any of these groups. In particular, Bob will know that group G7 lists groups G9 and G10 as members. Therefore, in order to prove non-membership in group G7, Alice will also need to present to Bob group non-membership certificates for the groups G9 and G10.

An Embodiment of the Invention

As shown in FIG. 1, a computer network 100 includes a network "cloud" 102 that provides the interconnection for devices on the network. The network cloud 102 may represent a simple local area network, for example, an Ethernet on one floor of a building. At the other extreme, it may represent the entire worldwide Internet. The network cloud 102 may contain transmission lines, repeaters, routers, network backbones, network interconnect points, etc., depending upon the extent of the network which it represents.

A client can be any device capable of sending messages over the network and is generally thought of as an individual workstation, a desk-top computer, a mini-computer accessed by a terminal, a personal digital assistant (PDA), an embedded device, or some other relatively simple computer. A client is often a computer operated by one person, although an independently operating computer or a program operating without human intervention can also be a client. Client computer Alice 104 and two additional client computers 106, 108 are shown connected to the network cloud 102. A modern network may include thousands of client computers.

A resource server Bob 110 is also connected to network cloud 102. A resource server can be any device capable of receiving messages over a network and is usually thought of as a larger computer, which contains resources to which client computers desire access. For example, a resource may be a database, a file system, etc. A resource 112 on resource server Bob 110 represents any resource to which a client may desire access. An Access Control List (ACL) 114 contains a list of clients which are permitted to access the resource 112. As a convenience, clients may be assigned membership in groups of clients, designated groups G1, G2, G3, . . . , GN, having associated group servers 130, 132, 134, 136. Accordingly, ACL 114 may also contain the names of groups whose member clients are permitted access to the resource 112.

An Off-line Certification Authority (OCA) server 120 issues identity certificates used by clients to identify themselves when seeking access to various resources on various servers, such as client Alice 104 access to resource 112. A switch 122 represents the ability of the OCA server 120 to be temporarily connected to the network cloud 102 so that it may, at selected times, issue an identity certificate to a client. The switch 122 is in "open" position most of the time to protect the OCA server 120 from attacks by malicious persons.

An On-line Revocation (OR) server 124 is connected to network cloud 102 on a substantially permanent basis. The OR server 124, upon request from a client, issues a non-revocation certificate stating that a particular client's identity certificate, previously issued by the OCA server 120, has not been revoked as of the time stamp. The non-revocation certificate is then transmitted to the requesting client.

Figure 2:
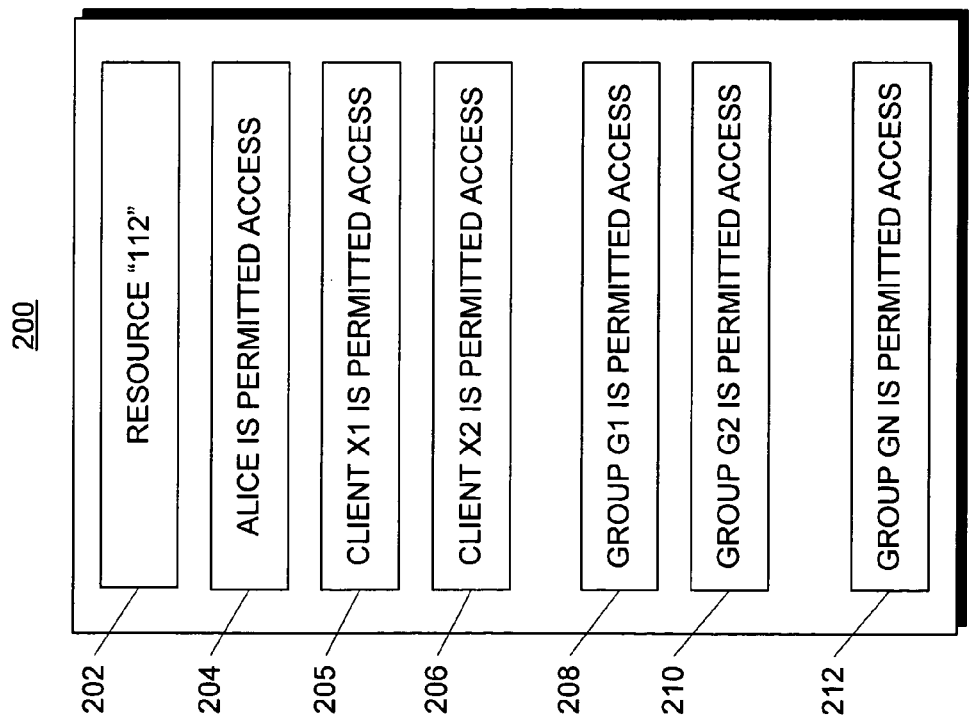
FIG. 2 is an example of an Access Control List (ACL)

FIG. 2 shows a typical Access Control List (ACL) 200 having a name field 202, in this case "112", and access entries. The first access entry 204 specifies that client Alice 104 is permitted access. Additional access entries for client computers x1 and x2 205, 206, along with groups G1, G2 and GN 208, 210, 212, round out the list.

Figure 3:
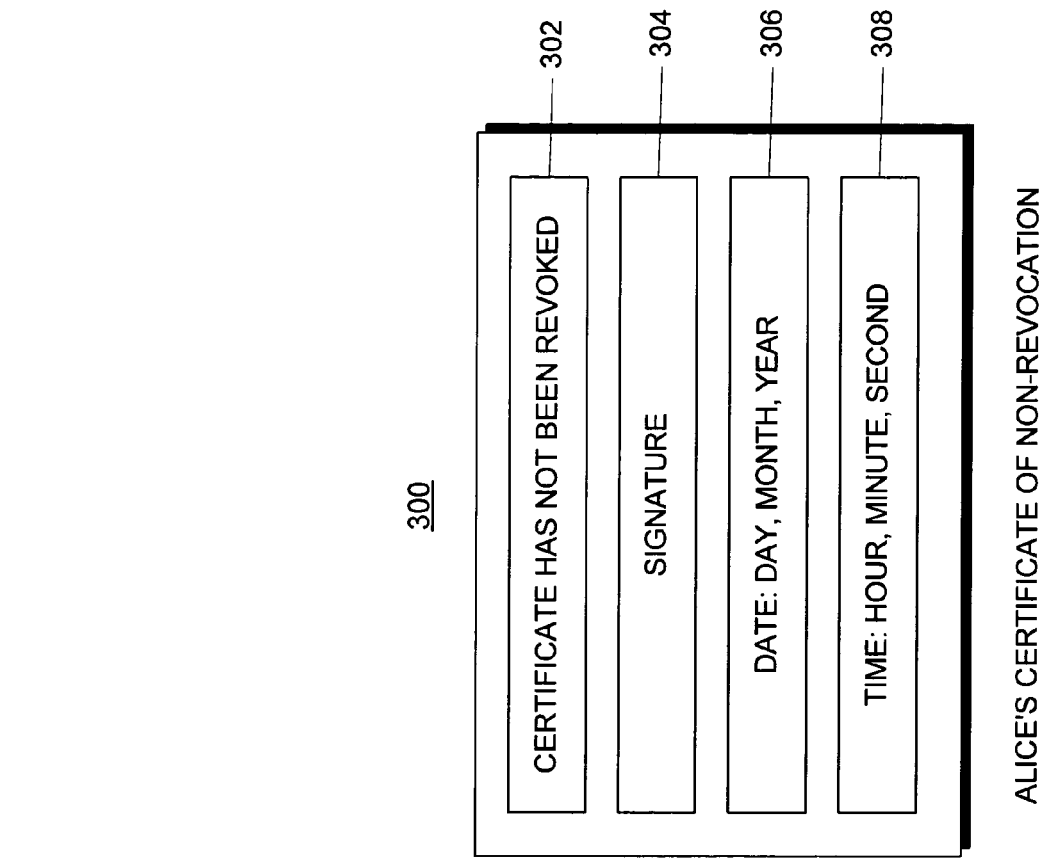
FIG. 3 is an example of a non-revocation certificate.

FIG. 3 shows a typical non-revocation certificate 300 issued to client Alice 104 by the OR server 124. Client Alice 104 had previously obtained a certificate from the OCA server 120. The OR server 124 maintains a list of certificates which have been revoked. Upon receipt of a request from a client, the OR server 124 checks its revocation list and, assuming that the subject certificate is not on that list, issues a non-revocation certificate. The first entry 302 in the non-revocation certificate 300 indicates that a previously issued certificate for client Alice 104 has not been revoked. Additionally, the non-revocation certificate 300 includes a signature entry 304, and a time stamp comprising an issue date entry 306 and time entry 308.

Resources may have recency requirements for credentials, such as non-revocation certificates, group membership certificates and group non-membership certificates. For example, resource server Bob 110 may require that the credentials used to access the resource 112 be no more than one-day old, or possibly no more than 10 minutes old, depending upon the level of security desired for the resource 112, the number of clients requesting the resource 112, and the number of requests which OR server 124 can handle.

Figure 4:
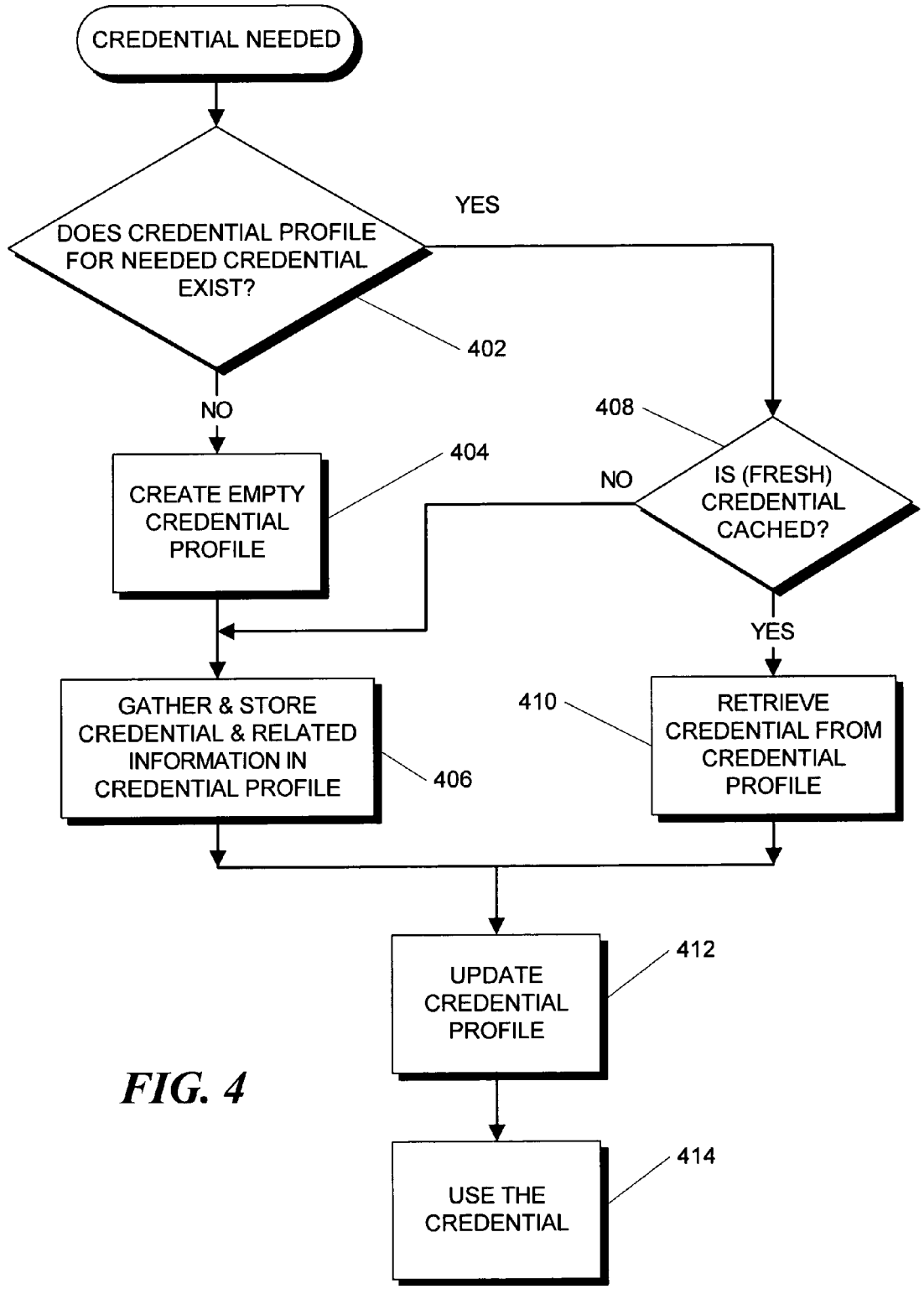
FIG. 4 is a flow diagram of a credential gathering and processing procedure.

Before describing a pro-active credential refreshing procedure, an illustrative credential profile gathering and processing procedure will first be described as shown in FIG. 4. For each procedure, each entity on the computer network may include a processor with an associated memory, which contains instructions for performing one or more steps of the procedure. Persistent storage of these instructions may be in a server system remote from the network entity and its processor. It is understood that the procedure performed by instructions may be stored in a magnetic or optical disks, semiconductor memories and the like, collectively referred to as a processor executable medium. The electrical signals that carry digital data representing the instructions are exemplary forms of carrier waves used for transporting information from a server system to a network entity.

Referring to FIG. 4, at block 401, client Alice 104 needs a particular credential. At block 402, Alice 104 determines if there is a credential profile for the needed credential. In one example, a credential profile is a record stored in the memory and includes information such as; a credential identifier, when the credential was issued, when the credential was last used, on which resource, resource constraints such as a recency requirement and so forth. From the credential profiles, Alice 104 retrieves the necessary credentials required to access resources. A profile collection is, as the name implies, a collection of the credential profiles. Below is an example of a profile collection:

| CREDENTIAL | ISSUED | LAST USED | RE-SOURCE | REGENCY RE-QUIREMENT |
|---|---|---|---|---|
| G1 GROUP CERT | 9 AM Oct. 2, 1999 | 10 AM Oct. 4, 1999 | SUN'S WEB | 1 HOUR |
| NON-REVO-CATION CERT | 10 AM Nov. 5, 1999 | 10 AM Dec. 6, 1999 | ENG SPEC | 20 MINUTES |

If Alice 104 does not detect a credential profile for the needed credential, then at block 404, Alice 104 creates an empty credential profile. At block 406, Alice proceeds to gather the credential and related information that make up the credential profile.

In one example, the credential and related information may be obtained from manual entry by the user including an administrator. In another example, Alice 104 "learns" the resources accessed by the user over a period of time and predicts which credentials are required for those resources. For instance, Bob 110 may control several resources that are accessed by the user. When the user accesses one or more of Bob's resources, Alice 104 creates the credential profiles having resource-specific information on those accessed resources. For example, Alice 104 may learn that Bob 110 requires a chain of group certificates before allowing access to a certain resource. Obtaining a chain of group certificates is generally time consuming. Thus, Alice 104 retrieves and stores those group certificates, along with its corresponding resource-specific information in a credential profile. Alice 104 may deduce the various resource-specific information from various access attempts. In instances where it is available, Alice 104 may directly obtain the resource-specific information from a directory or from Bob.

Blocks 408–414 are generally the steps performed by Alice 104 for credential processing where she retrieves a credential for resource access. In block 408 (which is optional) Alice 104 may check the recency requirement of a credential in a credential profile to determine if the credential is fresh (i.e., if the credential meets the resource server's recency requirement). If not, then Alice 104 initiates a credential refresh procedure (such as the example shown in FIG. 5) to gather and store a fresh credential. Otherwise, in block 410, Alice 104 retrieves the credential from the credential profile for resource access. In block 412, Alice 104 updates the field that indicates the certificate last used in the credential profile. In block 414, Alice uses the retrieved credentials to access the resource.

So far, we have assumed that Alice 104 is the one that will be doing the work to gather the necessary credentials and to create a profile collection. It may be that Alice 104 may not have the capacity to perform the work because she does not have sufficient processing power. Otherwise, it may be that the resource server Bob 110 may not want to divulge various resource-specific information to Alice 104 for security reasons. Thus, in the case where Bob 110 does the work, Bob similarly performs the procedure above to gather and process the necessary credentials. It is assumed that Bob 110 knows the resource-specific constraints for the resources that he is protecting. Thus, referring to FIG. 4, in block 402, when client Alice 104 requests access to one of Bob's resources, Bob 110 looks for a credential profile for the needed credential in his memory to determine whether Alice 104 is allowed access. If the credential profile does not exist, in block 404, Bob 110 creates an empty credential profile. At block 406, Bob proceeds to gather the credential that makes up the credential profile. Because Bob 110 knows its resource-specific constraints, Bob will probably be able to insert the various constraints in the profile along with the gathered credential. For example, Bob 110 may notice that he needs a group membership list from group server G1 to determine whether access should be granted to a particular resource, and from the resource constraints, Bob may know that the recency requirement is one hour from the time the list is issued. Thus, Bob 110 may refresh the group member list every hour during his spare time and allow Alice 104 to access the resource if she is a member in the list. Blocks 408–414 are generally the steps performed by Bob 110 for the credential processing and is similar to that performed by Alice, which has been described above.

Figure 5:
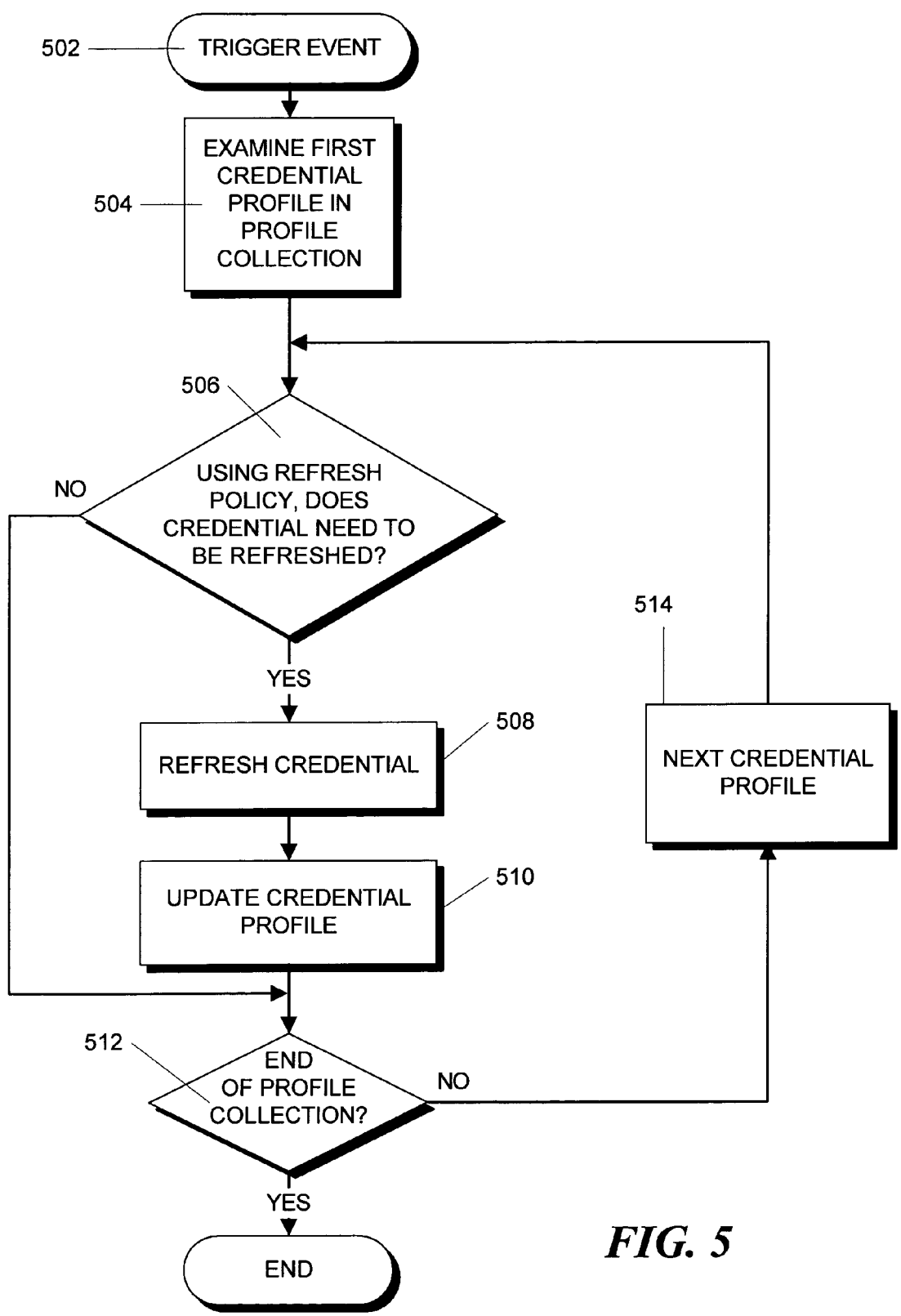
FIG. 5 is a flow diagram of a pro-active credential refreshing procedure.

FIG. 5 is an illustrative flow diagram 500 of a pro-active credential refreshing procedure. As described above, there are many instances in which resource server Bob 110 will not accept from client Alice 104, certificates that are not current. In those instances, previously, Alice 104 requested new credentials at the time of access, which delayed the Alice-Bob transaction. The problem is further compounded in instances where Alice 104 needs to prove a group membership involving a chain of group membership certificates or a complicated Boolean construction of group membership certificates. The pro-active refreshing procedure keeps the credentials fresh and available for resource access.

In block 502, client Alice 104 detects a trigger event that initiates the execution of the refresh procedure. The refresh procedure may be performed in accordance with a refresh policy that has been previously predetermined. For example, the refresh policy may be simple such as (1) refresh all credentials older than 10 minutes, or it may have more than one criteria such as (2) refresh all credentials used in the last 24 hours and older than 10 minutes, or (3) refresh all credentials used in the last 24 hours and only if older than the resource recency requirements. These various criteria may be deduced from the credential profiles stored with the credentials. Note that the above mentioned refresh policies are merely examples and the refresh policies are tailored according to a desired result.

In blocks 504–506, Alice 104 examines a credential profile in the profile collection to determine if it needs to be refreshed. For example, assuming refresh policy (3) is used for refreshing purposes, Alice 104 first checks the pertinent field in the credential profile to determine if the credential was last used within the 24 hours. If so, then Alice 104 compares the recency requirement with the credential issue date, both which are also stored in the credential profile. If the credential is determined to be stale, in block 508, Alice 104 pro-actively refreshes the credential. Once the credential has been refreshed, in block 510, Alice updates the issue date of the credential in the profile. Alice 104 may sequentially examine the various credential profiles in the profile collection until the credentials are fresh as performed by the repetition routine of blocks 512–514.

Note that there are instances in which Alice 104 may not refresh credentials that are stale. For example, Bob 110 may have a recency requirement of 24 hours on credentials that are presented for access to a certain resource. However, Alice 104 may know that she needs to present those credentials every Friday afternoon for access and, thus, may refresh the credentials on Friday morning so that they will be fresh at access time. In another instance, Alice 104 may keep track of how often the various resources are accessed and further, when the various resources are accessed. With this information, she predicts with certain probability when the various resources will be used and refreshes the credentials such that the credentials are fresh at access time. There may be instances where a certain resource is rarely used, thus, Alice 104 may decide that it is too time consuming to refresh the credentials of that resource and decide to gather the credentials at access time. In yet another instance, Alice 104 may retrieve previously used credentials before any resource access is performed. For example, if yesterday, client Alice used group membership certificates for G1 and G2 to access various resources, she stores the certificates in the memory. When Alice 104 logs in today she may obtain group membership certificates from the memory before accessing any resources since there is a likelihood that she will need them.

In the case where the resource server Bob 110 is doing the work, Bob may also perform a similar refreshing procedure as shown in FIG. 5. In block 502, Bob 110 detects a trigger event that indicates a performance of a refresh procedure. The trigger event may be in accordance with a refresh policy that has been previously determined. In blocks 504–506, Bob 110 examines a credential profile in the profile collection to determine if it needs to be refreshed. If the credential needs to be refreshed, in block 508, Bob 110 proactively refreshes the credential. Once the credential has been refreshed, in block 510, Bob updates the issue date of the credential in the profile. Bob 110 may sequentially examine the various credential profiles in the profile collection until the credentials are fresh as performed by the repetition routine of blocks 512–514.

The foregoing description has also been directed to specific embodiments of this invention. It will be apparent, however, that other variations and modifications may be made to the described embodiments, with the attainment of some or all of their advantages. Therefore, it is the object of the appended claims to cover all such variations and modifications as come within the true spirit and scope of the invention.

What is claimed is:

1. A method of pro-actively refreshing credentials by an entity that maintains credentials, the method comprising:
    a) determining credentials that are required to access resources including resource-specific constraints that indicate when the credentials must be refreshed;

b) storing in a memory, a profile collection having at least one credential profile, each credential profile including a credential, resource-specific constraints for the credential and related information; and c) for each credential profile in the profile collection:
  i) in accordance with at least one criterion of a refresh policy and prior to a time of presentation of the credential, making a determination, from that credential profile's resource-specific constraints, of whether that credential needs to be refreshed so that, at the time of presentation, that credential will meet the resource-specific constraints;
  ii) replacing the stored credential with a new credential in the credential profile if the stored credential does need to be refreshed; and
  iii) updating the related information of the new credential in the credential profile.

2. The method of claim 1, wherein the method further comprises creating the profile collection by, for each of at least one needed credential, determining whether the profile collection includes a credential profile for needed credentials, and, if not, then:
  creating an empty credential profile;
  gathering that needed credential;
  storing that needed credential in the credential profile;
  obtaining related information including resource constraints on that needed credential; and
  storing the information in the credential profile.

3. The method of claim 2, wherein the resource constraints are obtained by manual entry of a user.

4. The method of claim 2, wherein the resource constraints are deduced through access attempts.

5. The method of claim 2, wherein the resource constraints are obtained from a directory.

6. The method of claim 2, wherein the constraints are obtained from a resource server.

7. The method of claim 2, wherein the stored credential includes a public key identity credential.

8. The method of claim 2, wherein the stored credential includes a group membership credential.

9. The method of claim 2, wherein the stored credential includes a group non-membership credential.

10. The method of claim 2, wherein the stored credential includes a non-revocation credential.

11. The method of claim 2, wherein the stored resource constraints include a recency requirement.

12. The method of claim 2, wherein the stored resource constraints include a trust level.

13. The method of claim 2, wherein the stored resource constraints include a maximum credential chain length.

14. The method of claim 1, wherein the related information includes a credential identifier.

15. The method of claim 1, wherein the related information includes when the credential was issued.

16. The method of claim 1, wherein the related information includes when the credential was last used for a resource access.

17. The method of claim 1, wherein the related information includes information on the resource on which the credential was last used.

18. The method of claim 1, wherein at least one said criterion is such that the method includes refreshing credentials that are older than a certain time period.

19. The method of claim 1, wherein at least one said criterion is such that the method includes refreshing credentials that were last used within a certain time period.

20. The method of claim 1, wherein at least one said criterion is such that the method includes refreshing credentials that are older than an associated recency requirement.

21. The method of claim 1, wherein at least one said criterion is such that the method includes refreshing credentials that are predicted to be used in a next session.

22. A processor readable medium having instructions contained therein which when executed by a processor causes the processor to execute a method of pro-actively refreshing credentials by an entity that maintains credentials, the method comprising:

a) determining credentials that are required to access resources including resource-specific constraints that indicate when the credentials must be refreshed;

b) storing in a memory, a profile collection having at least one credential profile, each credential profile including a credential, resource-specific constraints for the credential and related information; and c) for each credential profile in the profile collection:
  i) in accordance with at least one criterion of a refresh policy and prior to a time of presentation of the credential, making a determination, from that credential profile's resource-specific constraints, of whether that credential needs to be refreshed so that, at the time of presentation, that credential will meet the resource-specific constraints;
  ii) replacing the stored credential with a new credential in the credential profile if the stored credential needs to be refreshed; and
  iii) updating the related information of the new credential in the credential profile.

23. The processor readable medium of claim 22 wherein the method further comprises creating the profile collection for each of at least one needed credential determining whether the profile collection includes a credential profile for that needed credential, and, if not, then
  creating an empty credential profile;
  gathering that needed credential;
  storing that needed credential in the credential profile;
  obtaining related information including resource constraints on that needed credential; and
  storing the information in the credential profile.

24. The processor readable medium of claim 23, wherein the resource constraints are obtained by manual entry of a user.

25. The processor readable medium of claim 2 wherein resource constraints are obtained by deducing them through access attempts.

26. The processor readable medium of claim 2 wherein resource constraints are obtained from a directory.

27. The processor readable medium of claim 2 wherein resource constraints are from a resource server.

28. The processor readable medium of claim 2 wherein the stored credential includes a public key identity credential.

29. The processor readable medium of claim 2 wherein the stored credential includes a group membership credential.

30. The processor readable medium of claim 2 wherein the stored credential includes a group non-membership credential.

31. The processor executable readable medium of claim 2 wherein the stored credential includes a non-revocation credential.

32. The processor readable medium of claim 2 wherein the stored resource constraints include a recency requirement.

33. The processor readable medium of claim 2 wherein the stored resource constraints include a trust level.

34. The processor readable medium of claim 23, wherein the stored resource constraints include a maximum credential chain length.

35. The processor executable-readable medium of claim 2 wherein the related information includes a credential identifier.

36. The processor readable medium of claim 21 wherein the related information includes information on when the credential issued.

37. The processor readable medium of claim 2 wherein the related information includes information on when the credential last used for a resource access.

38. The processor readable medium of claim 2 wherein the related information includes information on the resource on the resource on the credential was last used.

39. The processor readable medium of claim 2 wherein at least one said criterion is such that the method includes refreshing credentials that are older than a certain time period.

40. The processor readable medium of claim 2 wherein at least one said criterion is such that the method includes refreshing credentials that were last used within a certain time period.

41. The processor readable medium of claim 2 wherein at least one said criterion is such that the method includes refreshing credentials that are older than an associated recency requirement.

42. The processor executable readable medium of claim 2 wherein at least one said criterion is such that the method includes refreshing credentials that are predicted to be used in a next session.

43. A system for pro-actively refreshing credentials by an entity that maintains credentials, the system comprising:
   a mechanism that determines credentials that are required to access resources including resource-specific constraints that indicate when the credentials must be refreshed;
   a memory to store a profile collection having at least one credential profile, each credential profile including a credential, resource-specific constraints for the credential and related information;
   a circuit to read the credential profile;
   a refresh policy stored in the memory to determine prior to a time of presentation of the credential, if the credential needs to refreshed using the resource-specific constraints so that, at the time of presentation, that credential will meet the resource-specific constraints, wherein the circuit replaces the stored credential with a new credential in the credential profile if the stored credential needs to be refreshed and the circuit updates the related information of the new credential in the credential profile.

44. The system of claim 43, wherein the circuit is configured to determine, for each of at least one needed credential, whether the profile collection includes a credential profile for that needed credential, and, if not, then create an empty credential profile in the memory, gather that needed credential; store that needed credential in the credential profile; obtain related information including resource constraints on that needed credential, and store the information in the credential profile.

45. The system as in claim 44, wherein the circuit is a processor.

46. The system of claim 44, wherein the resource constraints are obtained by manual entry of a user.

47. The system of claim 44, wherein the resource constraints are deduced through access attempts.

48. The system of claim 44, wherein the resource constraints are obtained from a directory.

49. The system of claim 44, wherein the resource constraints are obtained from a resource server.

50. The system of claim 44, wherein the stored credential includes a public key identity credential.

51. The system of claim 44, wherein the stored credential includes a group membership credential.

52. The system of claim 44, wherein the stored credential includes a group non-membership credential.

53. The system of claim 44, wherein the stored credential includes a non-revocation credential.

54. The system of claim 44, wherein the stored resource constraints include a recency requirement.

55. The system of claim 44, wherein the stored resource constraints include a trust level.

56. The system of claim 44, wherein the stored resource constraints include a maximum credential chain length.

57. The system of claim 43, wherein the related information includes a credential identifier.

58. The system of claim 43, wherein the related information includes when the credential was issued.

59. The system of claim 43, wherein the related information includes when the credential was last used for a resource access.

60. The system of claim 43, wherein the related information includes on which resource the credential was last used.

61. The system of claim 43, wherein the refresh policy refreshes credentials that are older than a certain time period.

62. The system of claim 43, wherein the refresh policy refreshes credentials that were last used within a certain time period.

63. The system of claim 43, wherein the refresh policy refreshes credentials that are older than an associated recency requirement.

64. The system of claim 43, wherein the refresh policy refreshes credentials that are predicted to be used in a next session.

* * * * *

UNITED STATES PATENT AND TRADEMARK OFFICE
CERTIFICATE OF CORRECTION

| | |
|---|---|
| PATENT NO. | : 7,058,798 B1 |
| APPLICATION NO. | : 09/547183 |
| DATED | : June 6, 2006 |
| INVENTOR(S) | : Elley et al. |

It is certified that error appears in the above-identified patent and that said Letters Patent is hereby corrected as shown below:

Column 14,
Claim 25, Line 46, please replace "claim 2 wherein resource" with "claim 23 wherein the resource".
Claim 26, Line 49, please replace "claim 2" wherein resource" with "claim 23 wherein the resource".
Claim 27, Line 51, please replace "claim 2" wherein resource" with "claim 23 wherein the resource".
Claim 28, Line 53, please replace "claim 2" with "claim 23".
Claim 29, Line 56, please replace "claim 2" with "claim 23".
Claim 30, Line 59, please replace "claim 2" with "claim 23".
Claim 31, Line 62, please replace "claim 2" with "claim 23".
Claim 32, Line 65, please replace "claim 2" with "claim 23".

Column 15
Claim 33, Line 1, please replace "claim 2" with "claim 22".
Claim 35, Line 6, please replace "processor executable-readable medium of claim 2" with "processor readable medium of claim 22".
Claim 36, Line 9, please replace "claim 21" with "claim 22".
Claim 37, Line 12, please replace "claim 2" with "claim 22".
Claim 37, Line 14, please replace "credential last used" with "credential was last used".
Claim 38, Line 15, please replace "claim 2" with "claim 22".
Claim 38, Line 17, please replace "on the resource on the credential" with "on which the credential".
Claim 39, Line 18, please replace "claim 2" with "claim 22".
Claim 40, Line 22, please replace "claim 2" with "claim 22.
Claim 41, Line 26, please replace "claim 2" with "claim 22".

UNITED STATES PATENT AND TRADEMARK OFFICE
CERTIFICATE OF CORRECTION

| | |
|---|---|
| PATENT NO. | : 7,058,798 B1 |
| APPLICATION NO. | : 09/547183 |
| DATED | : June 6, 2006 |
| INVENTOR(S) | : Elley et al. |

It is certified that error appears in the above-identified patent and that said Letters Patent is hereby corrected as shown below:

Claim 42, Line 30, please replace "processor executable readable medium of claim 2" with "processor readable medium of claim 22".

Claim 43, Line 47, please replace "needs to refreshed" with "needs to be refreshed".

Signed and Sealed this

Eighth Day of August, 2006

JON W. DUDAS
*Director of the United States Patent and Trademark Office*